(12) United States Patent
Brocheton

(10) Patent No.: US 8,183,170 B2
(45) Date of Patent: May 22, 2012

(54) CONTRAST-ENHANCING UV-ABSORBING GLASS AND ARTICLES CONTAINING SAME

(75) Inventor: Yves Andre Henri Brocheton, Samoreau (FR)

(73) Assignee: Corning Incorporated, Corning, NY (US)

( * ) Notice: Subject to any disclaimer, the term of this patent is extended or adjusted under 35 U.S.C. 154(b) by 432 days.

(21) Appl. No.: 12/445,847

(22) PCT Filed: Oct. 11, 2007

(86) PCT No.: PCT/US2007/021704
§ 371 (c)(1),
(2), (4) Date: Dec. 3, 2009

(87) PCT Pub. No.: WO2008/048460
PCT Pub. Date: Apr. 24, 2008

(65) Prior Publication Data
US 2010/0073765 A1 Mar. 25, 2010

(30) Foreign Application Priority Data

Oct. 17, 2006 (EP) ................................. 06301054

(51) Int. Cl.
*C03C 3/11* (2006.01)
*C03C 4/00* (2006.01)
*C03C 14/00* (2006.01)
*C03C 3/095* (2006.01)
*C03C 3/093* (2006.01)

(52) U.S. Cl. ............... 501/56; 501/13; 501/32; 501/64; 501/67

(58) Field of Classification Search ............ 501/13, 501/32, 56, 57, 58, 59, 64, 67
See application file for complete search history.

(56) References Cited

U.S. PATENT DOCUMENTS

| | | | | |
|---|---|---|---|---|
| 3,941,605 A | * | 3/1976 | Yamashita | 501/13 |
| 4,101,302 A | * | 7/1978 | Krohn et al. | 65/30.11 |
| 5,039,631 A | | 8/1991 | Krashkevich et al. | |
| 5,077,240 A | | 12/1991 | Hayden et al. | |
| 5,190,896 A | | 3/1993 | Pucilowski et al. | |
| 5,242,869 A | | 9/1993 | Tarumi et al. | |
| 5,430,573 A | * | 7/1995 | Araujo et al. | 359/361 |
| 5,446,007 A | | 8/1995 | Krashkevich et al. | |
| 5,932,501 A | | 8/1999 | Brocheton | |
| 6,145,984 A | | 11/2000 | Farwig | |
| 6,334,680 B1 | | 1/2002 | Larson | |
| 6,420,290 B1 | * | 7/2002 | Brocheton et al. | 501/64 |
| 2005/0054512 A1 | * | 3/2005 | Brocheton et al. | 501/56 |

FOREIGN PATENT DOCUMENTS
FR 2815958 A 5/2002
* cited by examiner

*Primary Examiner* — Karl Group
*Assistant Examiner* — Elizabeth A Bolden
(74) *Attorney, Agent, or Firm* — Robert P. Santandrea; Dean Y. Shahriari

(57) ABSTRACT

Disclosed are CuX-containing, $Nd_2O_3$-containing, UV-absorbing and contrast-enhancing glasses and article comprising the same. The glass has improved UV-absorption and color enhancing capabilities compared to glasses described in the prior art. The glass can be used in sunglass lenses and light filters of information displays.

18 Claims, 2 Drawing Sheets

CONTRAST-ENHANCING UV-ABSORBING GLASS AND ARTICLES CONTAINING SAME

CROSS-REFERENCE TO RELATED APPLICATIONS

This application claims the benefit of priority to PCT Patent Application No. PCT/US2007/021704, filed on Oct. 11, 2008, which claims the benefit of priority to European Patent Application No. 06301054.0 filed Oct. 17, 2006.

FIELD OF THE INVENTION

The present invention relates to contrast-enhancing, UV-absorbing glass composition and articles comprising the same. In particular, the present invention relates to $Nd_2O_3$-containing and CuX-containing glass composition having specific cut-off in the UV and absorption between about 520-580 nm wavelength range, and articles comprising the same. The present invention is useful, for example, in making sunglasses or display filters.

BACKGROUND OF THE INVENTION

It is known that normal human eyes can perceive light irradiation in the visible range, but with differing sensitivity at differing wavelength spans. For example, normal human eyes have the highest sensitivity at around 450 nm, 540 nm and 610 nm. Thus, it would be useful to filter off irradiation around about 500 nm and 580 nm in order to improve the perceived color contrast.

It has proven desirable to enhance the perceived color contrast by using glass materials having special filtering properties in the visible range. Some of the color and contrast-enhancing glasses as disclosed in the prior art are $Nd_2O_3$-containing glass. It is known that $Nd_2O_3$ has an absorption band between 565-595 nm.

It is also known that UV light, including UVA and UVB, are detrimental to the health of naked normal human eyes. The sunglass industry has developed and provided many versions of sunglass products to the general consumers, including polarizing products, photochromic products, and the like, many of which have UV-filtering properties.

Sunglasses that are both UV-absorbing and contrast-enhancing were proposed in the prior art before. However, some of such sunglasses were designed to have multiple layers in their structures, with at least one of them for the purpose of UV absorption, and at least one additional layer, typically bonded to the UV-absorbing layer, to perform the contrast-enhancing function. Such multi-layer structure are costly and cumbersome to manufacture, and can present stability issues, such as delamination between the layers overtime. An example of such sunglass design is provided in U.S. Pat. No. 6,604,824.

Single glass compositions having both UV-absorbing and contrast-enhancing properties were described in the prior art, such as WO 93/02109. However, the UV-absorbing and/or color filtering properties of such glasses still have room for improvement.

Therefore, there remains a genuine need of a single glass composition that is both UV-absorbing and contrast-enhancing which could be use for making sunglass lenses to protect the human vision and to improve the color perception at the same time.

The present invention satisfies this long-standing need.

SUMMARY OF THE INVENTION

According to a first aspect of the present invention, provided is a UV-absorbing and contrast-enhancing glass material comprising precipitated cuprous halide crystals and having a composition, expressed in terms of weight percentage of the total composition, consisting essentially of 30-65% $SiO_2$; 12-25% $B_2O_3$; 3-9% $Al_2O_3$; 2-8% $ZrO_2$; 0-5% $Li_2O$; 0-7% $Na_2O$; 0-10% $K_2O$; 5-20% $R_2O$; 0-10% alkaline earth oxides RO ($MgO+SrO+CaO+BaO$); 0-5% $ZnO+La_2O_3+Gd_2O_3+Y_2O_3+Ta_2O_3$; 0-5% $TiO_2$; 0-2% $CeO_2$; 0-10% $Pr_2O_3$; 5-15% $Nd_2O_3$; 0-10% $Er_2O_3$; 0-2% NiO; 0.25-1.5% CuO; 0-1% Cl; 0-3% Br; 0-2% other halogen; 0.3-3% total of halogens; and 0.3-4% SnO. The above percentages are expressed on the basis of oxides or the halogen alone, as the case may be.

In certain embodiments of the glass material of the present invention, it is desired that it comprises at least 10% by weight of $Nd_2O_3$ and $Pr_2O_3$ in total.

In certain embodiments of the glass material of the present invention, it is desired that it comprises 5.5-8.5% by weight of $Pr_2O_3$, as well as at least 5-10% of $Nd_2O_3$.

In certain embodiments of the glass material of the present invention, it is desired that the glass comprises about 0-3% of other coloring agents. In certain embodiments, it is desired that it comprises 0-2% coloring agents selected from the group consisting of: $V_2O_5$, $Cr_2O_3$, MnO, $Fe_2O_3$ and $CO_2O_3$.

In certain embodiments of the glass material of the present invention, it is desired that the total amounts of $CeO_2$, $Er_2O_3$, NiO, $Nd_2O_3$, $Pr_2O_3$, $V_2O_5$, $Cr_2O_3$, MnO, $Fe_2O_3$ and $CO_2O_3$ is between 7-25%.

In certain embodiments of the glass material of the preset invention, it is desired that it comprises 0-3% of $Sb_2O_3$ and $As_2O_3$.

In certain embodiments of the glass material of the present invention, it is desired that the total amount of SnO, $Sb_2O_3$ and $As_2O_3$ is between 0.3-4%, advantageously 2-4%.

According to certain embodiments of the glass material of the present invention, it comprises about 0.5-1% CuO. According to certain embodiments of the glass material of the present invention, it is essentially free of colloidal Cu metal.

According to certain embodiments of the glass material of the present invention, it has the following properties:

(i) a transmission of less than or equal to about 3% at about 400 nm, and a transmission at about 390 nm of about 0.0%/mm, when measured at 1 mm sample thickness; and (ii) an average transmission of TRD, TGR and TBL in the wavelength ranges of 610-650 nm, 480-520 nm and 420-460 nm, respectively, and a minimal transmission TMN-1 and TMN-2 in the ranges from 460-480 nm and 520-610 nm, respectively, when measured at 1 mm sample thickness, wherein:

(a) TBL, TGR and TRD are each at least 20%; and
(b) Min(TMN-1, TMN-2)<TBL<TGR<TRD, where Min(TMN-1, TMN-2) is the smaller of TMN-1 and TMN-2.

In certain embodiments, it is desired that the following requirements are met:

TMN-1<TBL<TGR<TRD; and TMN-2<TBL<TGR<TRD.

According to certain embodiments of the glass material of the present invention, it has the following composition, expressed as weight percentages on an oxide basis of metal oxides or on the basis of the halogens, as the case may be, of the total composition, consisting essentially of: 35-50% $SiO_2$; 15-20% $B_2O_3$; 5-7% $Al_2O_3$; 3-6% $ZrO_2$; 1-3% $Li_2O$; 2-5% $Na_2O$; 4-8% $K_2O$; 7-12% $R_2O$; essentially free of alkaline earth metal oxides; essentially free of ZnO, $La_2O_3$, $Gd_2O_3$ and $Y_2O_3$; essentially free of $CeO_2$ and $TiO_2$; 5.5-8.5% $Pr_2O_3$; 5-10% $Nd_2O_3$; at least 10% of $Pr_2O_3+Nd_2O_3$;

0-9% $Er_2O_3$; 0-1% NiO; 0.5-1.0% CuO; 0-0.8% Cl; 0.5-2.5% Br; essentially free of F and I; 0.3-3% total of halogens; and 2-4% SnO.

A second aspect of the present invention is an article comprising the UV-absorbing color-filtering glass material of the present invention, described summarily above and in greater details below.

According to certain preferred embodiments of the article of the present invention, the article comprises a lens for eyewear products. According to certain other embodiments of the article of the present invention, the article is an information display device which comprises a light-transmitting element comprising the glass material of the present invention described summarily above and in greater detail below. The article of the present invention can be an optical element for manipulating light passing through it, such as a lens, a prism, an etalon, and the like.

The present invention has the following advantages. First, it achieves UV-absorbing and contrast-enhancing objectives in a single glass composition, making it possible to make an article such as an ophthalmic lens capable of performing such dual function without the need of a multi-layer structure. Compared to multi-layer product as disclosed in the prior art, the present invention is more durable and less prone to quality deterioration. Second, the combination does not compromise the UV-absorbing capability of CuX crystals in the glass or the contrast-enhancing ability of $Nd_2O_3$ and/or $Pr_2O_3$ in the glass. Because CuX is essentially completely transparent in the wavelength range from 420-650, such CuX-containing contrast-enhancing glass gives more flexibility in designing the final glass composition to suit the needs of various consumers for differing tints of the glass.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitutes a part of this specification.

DETAILED DESCRIPTION OF THE INVENTION

Figure 1:
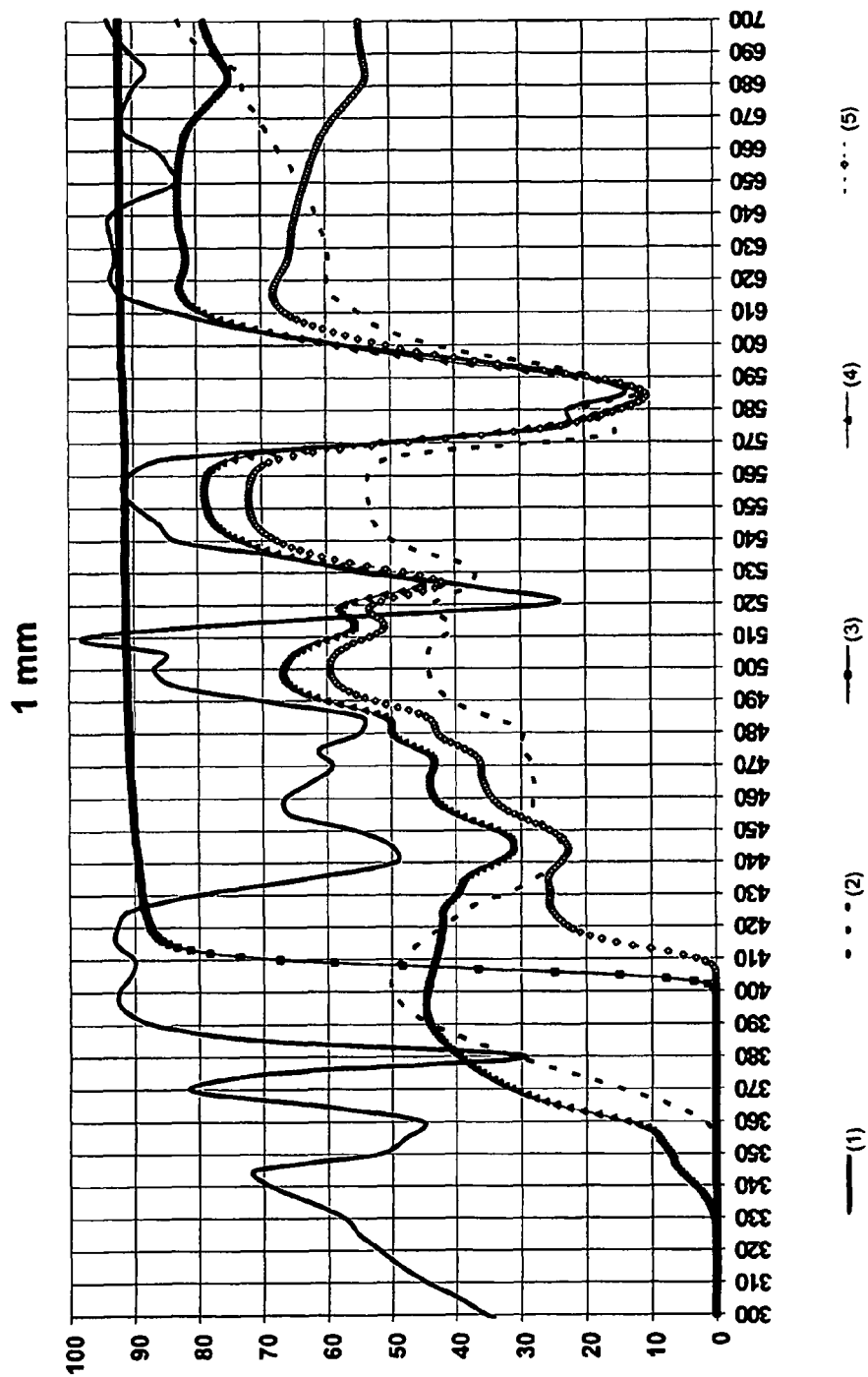
FIG. 1 is a diagram showing the light transmission curves of a series of glass materials according to several embodiments of the glasses of the present invention and certain glasses in the prior art.

In the present application, the weight percentages of oxides in a glass composition are those expressed in terms of the identified oxide, and the weight percentages of halogen (such as Br) in a glass composition are those expressed in terms of the identified halogens(s), regardless of the valencies of the metals or halogen in the composition. For example, the amount of Fe in the glass composition is calculated in terms of $Fe_2O_3$, even though Fe in the glass may be present in $Fe^{2+}$ and $Fe^{3+}$ status. For another example, the amount of Sn in the glass composition is calculated in terms of SnO, even though Sn in the glass may be present in $Sn^{2+}$ and $Sn^{4+}$ status. For yet another example, the total amount of Cu in the glass is expressed in terms of CuO, even though the glass may be present in the glass in the form of $Cu^{2+}$, $Cu^+$ and $Cu^0$.

Light transmission values provided in the present application are those measured at about 1 mm sample thickness without correcting surface reflection loss.

It is desired for many applications to enhance the contrast of target subjects with respect to background radiation. In addition, it is often desired to lower the UV radiation transmitted through a given glass, especially those with a wavelength shorter than about 380 nm, which are especially harmful for the naked human eyes. It has been reported that $Nd_2O_3$, when introduced into a glass, can work to improve the color contrast due to its natural combination of absorption bands in the visible region. In contrast enhancement glasses containing $Nd_2O_3$, it is also desired that the radiation coming from a desired subject maintain the true perceived color of the latter on passage through the glass and that the image of the subject be sharp. Glasses with such properties would be especially useful for the ophthalmic lenses, including plano lenses (such as sunglass lenses) and prescription lenses.

Glasses containing $Nd_2O_3$ and UV-absorbing agents, such as $CeO_2$, were described in the prior art before. For example, WO 93/02019 describes a $Nd_2O_3$ and $CeO_2$-containing glass that is claimed to be both UV-absorbing and contrast-enhancing. Some of the examples in this patent reference contain CuO. However, it is quite clear from the specification of this patent reference that CuO was added as a coloring agent, not as a UV-absorbing agent. There is no mention of the existence of cuprous halides in the glass. It is known that for the CuO contained in a glass material to be UV-absorbing, CuX (X being fluorine, chlorine, bromine, iodine, and mixtures and combinations thereof at various proportions) crystals must be formed in the glass. CuX crystals are typically formed by heat treating the glass at an elevated temperature such as at around or above 600° C. There is no indication of such heat treatment of the CuO-containing glass in this patent reference.

By the term "consisting essentially of," it is meant that the material of the present invention may comprise components in addition to those listed, as long as those additional components, in their added amounts, do not alter the basic and novel feature of the present invention, i.e., the combination of effective UV-absorption and contrast-enhancement.

The glasses of the present invention are borosilicates. $SiO_2$ is the primary glass network former. $B_2O_3$ is employed to aid the melting of the glass and is necessary for the formation and precipitation of CuX crystals in the glass when the glass is heat treated. It is preferred that the glass is tank melted. If the $B_2O_3$ content is too high, it could lead to inordinate dissolution of the tank refractory material, causing deleterious inclusion in the glass and severe tank wear, and the durability of the glass would suffer. $Al_2O_3$ is included in the glass to increase durability it provides to the glass and to reduce the likelihood of devitrification of the glass. If too much $Al_2O_3$ is included, the glass would be difficult to melt.

The alkali metal oxides enhance the meltability of the glass. The glass of the present invention is chemical strengthenable due to the presence of $Na_2O$ in the glass. The amount of $K_2O$ is desired to be maintained relatively low if chemical strengthenability of the glass is required. If the amount of $Li_2O$ in the glass is too high, unacceptable bulk glass crystallization can occur. If the total amount of $R_2O$ ($Li_2O$, $Na_2O$, $K_2O$, $Rb_2O$ and $Cs_2O$) is too high, the glass would have an unacceptable chemical durability.

Alkaline earth metal oxides (RO) can be included in the glass to improve the chemical durability of the glass. However, if the content of RO is too high, the meltability of the glass would be negatively affected.

$Nd_2O_3$ is the primary contrast-enhancing component. Amounts under 5 wt % could result in insufficient contrast, whereas higher than 15 wt % is generally not necessary.

$Pr_2O_3$ may be added to supplement the color enhancing properties of $Nd_2O_3$ in the glass. For optimal color enhancing properties, it is highly desired that both $Nd_2O_3$ and $Pr_2O_3$ are included in the glass, with $Nd_2O_3$ in the range of 5-10%, $Pr_2O_3$ in the range of 5.5-8.5%, and the total of $Nd_2O_3$ and $Pr_2O_3$ at least 10%.

Alkaline earth metal oxides, as swell as ZnO, $La_2O_3$, $Ta_2O_5$, $Gd_2O_3$, $Y_2O_3$, $Nb_2O_5$, $WO_3$, $MO_3$, and the like, may be included in the glass composition to adjust the melting property, refractive index, color filtering properties, abbe number, and the like, of the glass.

$Er_2O_3$ may be included in the glass to adjust the color filtering properties.

$CeO_2$, $TiO_2$ and $ZrO_2$ may be included in the glass of the present invention to alter the meltability and refractive index to desired levels. When included, these agents contribute partly to the UV-absorbing property of the glass of the present invention. However, since the UV-absorbing property of the glass of the present invention are mainly provided by the cuprous halide crystals in the glass, the inclusion of these additional UV-absorbing components are not required.

In addition to the primary color filtering agent, $Nd_2O_3$, and $Pr_2O_3$, additional coloring agents, such as $Er_2O_3$, $Fe_2O_3$ (in the form of FeO and/or $Fe_2O_3$ in the final glass), NiO, CoO (in the form of CoO and/or $Co_2O_3$ in the final glass), $V_2O_5$ (in the form of VO, $V_2O_3$, $VO_2$ and/or $V_2O_5$ in the final glass), $Cr_2O_3$, and additional coloring agents, may be included in the glass of the present invention, to impart the desired color and hue to the glass. One of ordinary skill in the art, in the light of the teaching of the present invention, may choose one or more of them, in various amounts as indicated in the present invention, to form a glass composition with the desired color filtering properties to achieve the desired color contrast effect as well as color coordinates in the color space.

As mentioned supra, cuprous halide (including, but not limited to, CuF, CuCl, CuBr, CuI, and any mixtures and combinations of at least two of them) serves as the main UV-absorbing agents in the glass of the present invention. By choosing the proper amounts of CuO, halides and reducing agents in the glass in the light of the teaching of the present application, one of ordinary skill in the art can make a glass of the present invention having a transmission cut-off at a about 380 nm, meaning that the transmission of the glass when measured on a 1 mm thick sample is essentially less than or equal to about 0.0%.

In order to reduce the CuO introduced into the glass composition to $Cu^{+1}$, it is required that in the glass batch, certain materials that can serve as reducing agents under glass melting conditions must be used. Among all reducing agents that could be used in melting glasses of the present invention, non-limiting mention can be made of carbon, carbon monoxide, forming gas, $H_2$, $NH_3$, SiC, SnO, $As_2O_3$, $Sb_2O_3$, and the like. SnO is a preferred reducing agent due to its environment-friendliness. $As_2O_3$ and $Sb_2O_3$ can provide the desired reducing effect, but with significant environmental concern due to the toxicity. $SnO_2$, $As_2O_5$ and $Sb_2O_5$ are known as effective glass fining agents as well.

The amount of reducing agents relative to the amount of CuO included in the to glass must be carefully controlled. If too much reducing agent is included, they could reduce $Cu^{+2}$ and $Cu^{+1}$ into its metallic state ($Cu^0$), resulting in the formation of colloidal Cu metal in the glass. Colloidal Cu metal is known to be highly absorbing in large wavelength range in the visible spectrum. Thus, over-reduction of Cu in the glass could lead to insufficient amount CuX and hence inadequate UV-absorbing capability, as well as overly low transmission in large range in the visible spectrum. The net result would be a glass that is too dark to the naked human eyes and too weak in protecting naked human eyes due to the inadequate UV-filtering property.

As mentioned supra, the UV-absorbing capability of the glass of the present invention is provided by the precipitated CuX crystals in the glass. Freshly melted glass produced in a large glass-melting tank, without additional thermal treatment, typically does not have sufficient amount of CuX crystals to provide the desired UV-absorbing capability for ophthalmic applications. To impart the formation and precipitation of CuX crystals in the glass of the present invention, it is typically desired that the glass, upon being discharged from the glass furnace and cooled to a relatively low temperature below about 500° C. (such as at around room temperature), is further subjected to heat treatment at a temperature higher than about 500° C., in certain embodiments higher than about 550° C., in certain other embodiments higher than about 600° C., in certain other embodiments higher than about 620° C.

The combination of CuX and $Nd_2O_3$ (and/or $Pr_2O_3$) in the glass is particularly advantageous. The inclusion of CuX imparts the desired UV-absorbing properties without negatively interfering with the light-filtering properties of $Nd_2O_3$ and/or $Pr_2O_3$. As a result of the combination of both, glass having the following highly desired properties can be made according to the present invention:

(i) a transmission of less than or equal to about 3% at about 400 nm, and a transmission at about 390 nm of about 0.0%/mm, when measured at 1 mm sample thickness; and (ii) an average transmission of TRD, TGR and TBL in the wavelength ranges of 610-650 nm, 480-520 nm and 420-460 nm, respectively, and a minimal transmission TMN-1 and TMN-2 in the ranges from 460-480 nm and 520-610 nm, respectively, when measured at 1 mm sample thickness, wherein:

(a) TBL, TGR and TRD are each at least 20%; and (b) Min(TMN-1, TMN-2)<TBL<TGR<TRD, where Min (TMN-1, TMN-2) is the smaller of TMN-1 and TMN-2.

In certain embodiments, both TMN-1<TBL<TGR<TRD and TMN-2<TBL<TGR<TRD.

The glass of the present invention can be made by melting in a conventional glass tank available in the prior art. The respective raw materials, in desired amounts, optionally together with cullets, are mixed and allowed to melt at a high temperature, fined, discharged from the furnace, pressed, molded, or otherwise shaped, annealed, and then cooled to room temperature. Alternatively, the glass could be melted by the float method. The resultant glass article is then treated in a furnace where it is heated to a temperature higher than about 500° C., where CuX crystals are allowed to form. The glass can then be subjected to down-stream processing, including, but not limited to, scoring, grinding, polishing, coating, and the like. Alternatively, the glass of the present invention may be first pressed, molded or otherwise processed into a near-net-shape product or a net-shaped product before the precipitation of CuX crystals in the glass, and subsequently heat-treated to impart the precipitation of the CuX crystals.

The article of the present invention comprising the glass of the present invention may be any optical element for manipulating light passing therethrough. Such optical element can be ophthalmic lenses, such as plano sunglass lenses, prescription sunglasses or normal prescription lenses, colored to various tint, to suit the needs of customers and patients. It is also contemplated that the article of the present invention could be an information display device, or part of an information display device, such as an LCD display faceplate, and the like.

The present invention is further illustrated by the following non-limiting examples.

EXAMPLES

Figure 2:
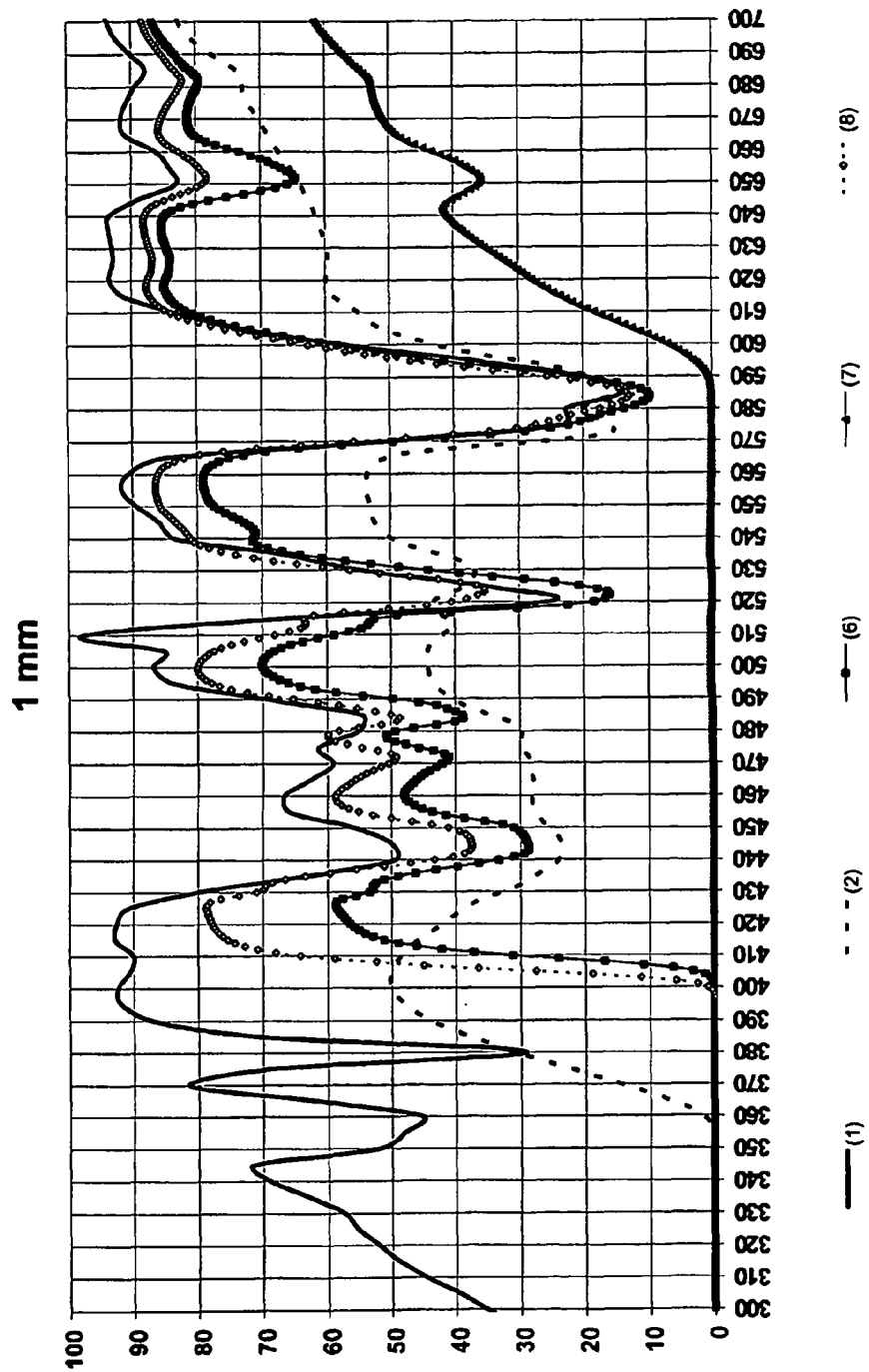
FIG. 2 is a diagram showing the light transmission curves of several glass materials according to some embodiments of the present invention and those of several comparative glass materials falling outside of the present invention.

In the following examples, various glasses were characterized of their UV-absorbing capability as well as color-filtering properties. Light transmission curves for these glasses are shown in FIGS. 1 and 2. The glasses of Example Nos. 1-2 were purchased from the commercial glass market as tiocrhoic contrast enhancer and were found to be essentially free of CuX. Example No. 3 is a CuX-containing glass of the prior art essentially free of $Nd_2O_3$ or $Pr_2O_3$. Glasses of Example Nos. 3-8 were batched melted, cooled down to around room temperature, and then heat treated at about 590° C. to impart precipitation of CuX crystals therein. The available compositions in weight percentage based on the total composition of the glasses and properties of the glasses are provided in TABLE I and TABLE II below, respectively.

The following observations can be made in light of the examples and comparative examples presented above in the tables below:

Refractive index can be adjusted to the standard value commonly used for ophthalmic application. This can be done by adding alkaline earth, zinc, transition metal or titanium oxides in addition to others base glass modifications. The use of NiO to achieve this goal is illustrated in Example No. 5.

In addition to $Pr_2O_3$ and $Nd_2O_3$, other coloring agents can be used to adjust visible transmittance or chromaticity to the desired values. Example No. 8 gives an example of the use of NiO. The list reported cannot be considered as limitative and to do that, cerium oxide can be used even if its presence is not required to absorb ultraviolet radiation.

A combination of copper, halide(s) and reducing agent(s) must be present in the glass to promote UV absorption. Any halogen or reducer can be used in the specified ranges.

The glass of Example No. 3 illustrates typical UV absorption obtained by copper halide precipitation described in the prior art. The glass does not present any ability to improve color discrimination and cannot be included in the invention.

The glass of Example No. 4 illustrates typical contrast enhancement obtained by adding adequate package of coloring agents into our base glass composition. Optical performances can be compared to those measured on glasses of Example Nos. 1 and 2.

The glass of Example No. 5 has the same base glass composition as Example No. 4 in which active elements such as copper, bromide and tin have been added to generate UV blocking performances. It also illustrates the use of a typical coloring agent (NiO) to adjust the transmission of throughout the visible spectrum.

Glasses of Example Nos. 6 and 8 are particularly advantageous composition because of their performances regarding UV absorption and color enhancement. They fully respect the requirements described in the present application.

The glass of Example No. 7 illustrates the impact of too high amount of added reducing agent (SnO) on optical properties. It emphasizes the strict control of the redox of copper to achieve the required properties and avoid undesirable precipitation. It is believed that the strong absorption in large ranges of the visible spectrum was due to the precipitation of colloidal Cu in the glass.

It will be apparent to those skilled in the art that various modifications and alterations can be made to the present invention without departing from the scope and spirit of the invention. Thus, it is intended that the present invention cover the modifications and variations of this invention provided they come within the scope of the appended claims and their equivalents.

TABLE I

| | Example No. | | | | | | | |
|---|---|---|---|---|---|---|---|---|
| | 1 | 2 | 3 | 4 | 5 | 6 | 7 | 8 |
| $Al_2O_3$ | — | — | 5.9 | 6.2 | 5.9 | 5.8 | 5.8 | 5.8 |
| $B_2O_3$ | 7.6 | 3.9 | 17.3 | 18.0 | 17.3 | 16.9 | 16.7 | 16.9 |
| BaO | 4.2 | 6.3 | — | — | — | — | — | — |
| Br | — | — | 2.33 | 0.00 | 2.33 | 2.33 | 2.33 | 2.33 |
| $CeO_2$ | — | 3 | — | — | — | — | — | — |
| CuO | — | — | 0.77 | 0.00 | 0.77 | 0.77 | 0.77 | 0.77 |
| $Er_2O_3$ | 6.3 | — | 0.0 | 0.0 | 0.0 | 5.9 | 5.9 | 2.6 |
| $K_2O$ | — | — | 5.6 | 5.8 | 5.6 | 5.4 | 5.4 | 5.5 |
| $Li_2O$ | — | — | 1.7 | 1.8 | 1.7 | 1.7 | 1.7 | 1.7 |
| $Na_2O$ | 13.5 | 18.4 | 3.7 | 3.9 | 3.7 | 3.7 | 3.6 | 3.7 |
| $Nd_2O_3$ | 7.2 | — | 0.0 | 6.8 | 6.5 | 6.8 | 6.7 | 6.1 |
| NiO | — | 0.2 | 0.0 | 0.3 | 0.3 | 0.0 | 0.0 | 0.0 |
| $Pr_2O_3$ | 7.1 | 6.8 | 0.0 | 4.0 | 3.8 | 6.7 | 6.6 | 6.7 |
| $Sb_2O_3$ | 0.26 | 0.5 | — | — | — | — | — | — |
| $SiO_2$ | 54.5 | 52.9 | 56.9 | 45.9 | 44.1 | 36.3 | 36.0 | 40.4 |
| SnO | — | — | 0.95 | 0.00 | 0.95 | 3.00 | 4.00 | 2.80 |
| $TiO_2$ | — | 3 | 0.0 | 2.3 | 2.2 | 0.0 | 0.0 | 0.0 |
| ZnO | — | 1 | — | — | — | — | — | — |
| $ZrO_2$ | — | — | 4.8 | 5.0 | 4.8 | 4.7 | 4.6 | 4.7 |

TABLE II

| | Example No. | | | | | | | |
|---|---|---|---|---|---|---|---|---|
| | 1 | 2 | 3 | 4 | 5 | 6 | 7 | 8 |
| Heat treatment | No | No | 30 min 590° C. | 30 min 590° C. | 30 min 590° C. | 30 min 590° C. | 30 min 590° C. | 30 min 590° C. |
| $T_v$ (Illuminant C) | 61.4 | 41.5 | 91.4 | 59.1 | 52.6 | 55.7 | 4.4 | 63.8 |
| x | 0.3151 | 0.3444 | 0.3122 | 0.3370 | 0.3387 | 0.3385 | 0.6824 | 0.3220 |
| y | 0.3174 | 0.3668 | 0.3194 | 0.3609 | 0.3865 | 0.3426 | 0.3062 | 0.3334 |
| T390 @ 1 mm | 86.8 | 43.7 | 0.0 | 44.1 | 0.0 | 0.0 | 0.0 | 0.0 |
| T400 @ 1 mm | 92.4 | 50.1 | 0.2 | 44.5 | 0.0 | 0.0 | 0.0 | 1.0 |
| TBL | 68.3 | 30.0 | 89.3 | 37.8 | 26.1 | 44.1 | 0.1 | 57.7 |
| TGR | 69.5 | 40.3 | 91.1 | 59.5 | 53.1 | 54.1 | 0.3 | 65.9 |

TABLE II-continued

|  | Example No. | | | | | | | |
| --- | --- | --- | --- | --- | --- | --- | --- | --- |
|  | 1 | 2 | 3 | 4 | 5 | 6 | 7 | 8 |
| TRD | 90.3 | 60.0 | 91.9 | 82.2 | 65.7 | 82.3 | 33.1 | 86.3 |
| TMN (460-480 nm) | 55.0 | 27.9 | 90.3 | 43.3 | 34.4 | 40.9 | 0.2 | 49.1 |
| TMN (520-610 nm) | 13.6 | 11.2 | 91.2 | 11.1 | 10.4 | 9.6 | 0.1 | 12.8 |

Tv: Average transmission of the glass at about 1 mm thickness between 300-900 nm
x and y: color coordinates under CIE 1931 of the transmitted spectrum of the glass when illuminated by Illuminant C for 2° observer.
T390 @ 1 mm: transmission at 390 nm when measured on a 1 mm thick sample
T400 @ 1 mm: transmission at 400 nm when measured on a 1 mm thick sample
TBL: average transmission between 420-460 nm when measured on a 1 mm thick sample
TGR: average transmission between 48-520 nm when measured on a 1 mm thick sample
TRD: average transmission between 610-650 nm when measured on a 1 mm thick sample
TMN: minimal transmission in the specified wavelength range

The invention claimed is:

1. A UV-absorbing color-filtering glass material comprising precipitated cuprous halide crystals and having a composition, expressed in terms of weight percentage of the total composition, consisting essentially of: 30-65% $SiO_2$; 12-25% $B_2O_3$; 3-9% $Al_2O_3$; 2-8% $ZrO_2$; 0-5% $Li_2O$; 0-7% $Na_2O$; 0-10% $K_2O$; 5-20% $R_2O$; 0-10% alkaline earth oxides RO (MgO+SrO+CaO+BaO); 0-5% $ZnO+La_2O_3+Gd_2O_3+Y_2O_3+Ta_2O_3+Nb_2O_5+Hf_2O_5+WO_3+MoO_3$; 0-5% $TiO_2$; 0-2% $CeO_2$; 0-10% $Pr_2O_3$; 5-15% $Nd_2O_3$; 0-10% $Er_2O_3$; 0-2% NiO; 0.25-1.5% CuO; 0-1% Cl; 0-3% Br; 0-2% other halogen; 0.3-3% total of halogens; and 0.3-4% SnO.

2. The glass material according to claim 1, wherein the material comprises at least 10% of $Pr_2O_3+Nd_2O_3$.

3. The glass material according to claim 1, wherein the material comprises 5-10% $Nd_2O_3$ and 5.5-8.5% $Pr_2O_3$.

4. The glass material according claim 1, wherein the material comprises 0.5-1% of CuO.

5. The glass material according to claim 1, wherein the glass material has a composition, expressed in terms of weight percentage of the total composition, consisting essentially of: 35-50% $SiO_2$; 15-20% $B_2O_3$; 5-7% $Al_2O_3$; 3-6% $ZrO_2$; 1-3% $Li_2O$; 2-5% $Na_2O$; 4-8% $K_2O$; 7-12% $R_2O$; essentially free of alkaline earth metal oxides; essentially free of ZnO, $La_2O_3$, $Gd_2O_3$ and $Y_2O_3$; essentially free of $CeO_2$ and $TiO_2$; 5.5-8.5% $Pr_2O_3$; 5-10% $Nd_2O_3$; at least 10.5% of $Pr_2O_3+Nd_2O_3$; 0-9% $Er_2O_3$; 0-1% NiO; 0.5-1.0% CuO; 0-0.8% Cl; 0.5-2.5% Br; essentially free of F and I; 0.3-3% total of halogens; and 2-4% SnO.

6. The glass material according to claim 1, further comprising 0-2% color agents selected from the group consisting of: $V_2O_5$, $Cr_2O_3$, MnO, $Fe_2O_3$, and $CO_2O_3$.

7. The glass material according to claim 1, wherein the total amount of $CeO_2$, $Er_2O_3$, $Nd_2O_3$, NiO, $Pr_2O_3$, $V_2O_5$, $Cr_2O_3$, MnO, $Fe_2O_3$ and $CO_2O_3$ is between 7-25%.

8. The glass material according to claim 1, further comprising 0-3% of $Sb_2O_3$ and $As_2O_3$.

9. The glass material according to claim 8, wherein the glass material comprises between 0.3-4% SnO, $Sb_2O_3$ and $As_2O_3$.

10. The glass material according to claim 9, wherein the glass material comprises between 2-4% SnO, $Sb_2O_3$ and $As_2O_3$.

11. The glass material according claim 1, wherein the glass material is essentially free of colloidal Cu metal.

12. The glass material according to claim 1, wherein the glass material has:
   (i) a transmission of less than or equal to about 3% at about 400 nm, and a transmission at about 390 nm of about 0.0%/mm, when measured at 1 mm sample thickness; and
   (ii) an average transmission of TRD, TGR and TBL in the wavelength ranges of 610-650 nm, 480-520 nm and 420-460 nm, respectively, and a minimal transmission TMN-1 and TMN-2 in the ranges from 460-480 nm and 520-610 nm, respectively, when measured at 1 mm sample thickness, wherein:
   [a] TBL, TGR and TRD are each at least 20%; -and
   [b] Min(TMN-1, TMN-2)<TBL<TGR<TRD; where Min(TMN-1, TMN-2) is the smaller of TMN-1 and TMN-2.

13. The glass material according to claim 12, wherein:
TMN-1<TBL<TGR<TRD; and
TMN-2<TBL<TGR<TRD.

14. An article comprising a UV-absorbing color-filtering material, the material comprising precipitated cuprous halide crystals and having a composition, expressed in terms of weight percentage of the total composition, consisting essentially of: 30-65% $SiO_2$; 12-25% $B_2O_3$; 3-9% $Al_2O_3$; 2-8% $ZrO_2$; 0-5% $Li_2$; 0-7% $Na_7O$; 0-10% $K_2O$; 5-20% $R_2O$: 0-10% alkaline earth oxides RO (MgO+SrO+CaO+BaO); 0-5% $ZnO+La_2O_3+Gd_2O_3+Y_2O_3+Ta_2O_3+Nb_2O_3+Hf_2O_5+WO_3+MoO_3$; 0-5% $TiO_2$; 0-2% $CeO_2$; 0-10% $Pr_2O_3$; 5-15% $Nd_2O_3$; 0-10% $Er_2O_3$; 0-2% NiO; 0.25-1.5% CuO; 0-1% Cl; 0-3% Br; 0-2% other halogens; 0.3-3% total halogens; and 0.3-4% SnO.

15. The article according to claim 14 wherein the article is a lens for eye wear product.

16. The article according to claim 14, wherein the article has a single layer structure.

17. The article according to claim 14, wherein the article is a light filter to be used in connection with an information display device.

18. The article according to claim 14, wherein the article is a refractive lens element in an optical element.

* * * * *